(12) United States Patent
Lee et al.

(10) Patent No.: US 6,178,015 B1
(45) Date of Patent: Jan. 23, 2001

(54) APPARATUS AND METHOD FOR INCREASING THE SCAN ACCURACY AND QUALITY OF THE FLATBED SCANNER BY USING CLOSE LOOP CONTROL

(75) Inventors: Wayne Lee, Miao Li; Jenn-Tsair Tsai, Taipei, both of (TW)

(73) Assignee: Mustek Systems, Inc. (TW)

( * ) Notice: Under 35 U.S.C. 154(b), the term of this patent shall be extended for 0 days.

(21) Appl. No.: 09/092,263

(22) Filed: Jun. 5, 1998

(51) Int. Cl.[7] .................................................. H04N 1/04
(52) U.S. Cl. .......................... 358/486; 358/497; 358/406; 358/474
(58) Field of Search ..................... 358/461, 456, 358/448, 474, 406, 486, 465, 497, 494, 488; 382/323; 250/208; 355/75; 399/211

(56) References Cited

U.S. PATENT DOCUMENTS

| | | | | |
|---|---|---|---|---|
| 3,428,744 | * | 2/1969 | Green et al. | 178/6 |
| 3,723,640 | * | 3/1973 | Perreault | 178/6 |
| 4,447,830 | * | 5/1984 | Stoffel | 358/283 |
| 4,974,098 | * | 11/1990 | Miyakawa et al. | 358/406 |
| 5,111,409 | * | 5/1992 | Gasper et al. | 395/152 |
| 5,595,445 | * | 1/1997 | Bobry et al. | 358/473 |
| 5,604,608 | * | 2/1997 | Walsh et al. | 358/486 |
| 5,899,981 | * | 5/1999 | Taylor et al. | 705/30 |
| 5,923,444 | * | 7/1999 | Bohn et al. | 358/473 |
| 5,940,546 | * | 7/1999 | Howard et al. | 382/313 |
| 5,963,343 | * | 10/1999 | Kubo et al. | 358/473 |
| 6,000,000 | * | 12/1999 | Hawkins et al. | 707/201 |

\* cited by examiner

*Primary Examiner*—Cheukfan Lee
(74) *Attorney, Agent, or Firm*—Pillsbury Madison & Sutro LLP

(57) ABSTRACT

An optical ruler is provided on the back surface side of the top housing and close to the transparent window along a scanning direction for providing a calibration reference. The optical ruler is formed with black and white blocks alternately arranged in an array. An image sensor which has a width larger than the width of the transparent window is provided for reading the image information of the optical ruler along with a scanned sheet while being progressively driven by a step motor. A determining element computes the actual moving steps of the step motor by calculating the number of black and white pixels from the scanned image of the optical ruler. When the actual moving steps of the step motor are fewer than a predetermined threshold value, or when the frequency of the occurrences of the scan line losses is higher than a predetermined threshold value, the image sensor is driven by the step motor to scan the sheet again. As a result, the step motor can be operated in response to a closed loop control signal depending on the actual moving steps of the step motor.

9 Claims, 2 Drawing Sheets

APPARATUS AND METHOD FOR INCREASING THE SCAN ACCURACY AND QUALITY OF THE FLATBED SCANNER BY USING CLOSE LOOP CONTROL

BACKGROUND OF THE INVENTION

1. Field of the Invention

The present invention relates to an apparatus and a method for improving the scan accuracy and quality for flatbed scanners, and more particularly, to an apparatus and a method for improving the scan accuracy and quality by using step motors with a closed loop control technology.

2. Description of the Prior Art

Science progresses have significantly brought many scanners to be manufactured for achieving kinds of requirements. All the reflective documents (such as papers and business cards) and transparent documents (such as projection slides or lantern slides) can be scanned by applying various scanners, and their scanned images can be stored for further processing. Typically, the scanners can be classified into flatbed scanners that put all scanned documents on the top of their transparent windows just like copy machines do, and feed-in scanners feed the scanned documents into the scanners for generating the scanned images. Recently, the scanners are manufactured smaller than before for achieving the purpose of building the scanners into computer cases. Although the build-in scanners have smaller sizes than before, however, the build-in scanners have becoming standard equipment for personal computers.

In addition to the aforementioned requirement for building in the computer cases, the scanners are also required to have a higher resolution for generating scanned images that are more pleasant to the viewer. For example, the resolution is increasing from 300 dpi (dot-per-inch) to 600 dpi or higher today. Conventionally, step motors are usually employed in the scanners for driving image sensors because an open loop control that controls the moving steps of the image sensors can be easily achieved. For example, the step motors can drive a CIS (Contact Image Sensor) to move step-by-step for scanning according to the sizes of the scanned documents.

Usually, the qualities of the scanned images will be significantly influenced by the step motors because the step motors generate resonant frequencies naturally when they work at low rotation speed (usually 150–250 pps (pulses per second)). Moreover, the step motors usually generate noise caused by the step-by-step motions. In addition, the open loop control is impossible to control the actual moving steps of the image sensors because there is no feedback information for confirming the actual moving steps. Another technology for controlling the moving steps is to apply a closed loop control that feeds back the current address of the image sensor for adjusting by using an additional address sensor. An encoder is thus needed to receive and encode the current address obtained from the address sensor to properly move the image sensor. Unfortunately, additional circuits are also required for the additional encoder, which will also significantly increase the cost of the scanner. A need has been arisen to disclose an apparatus, in which all the aforementioned disadvantages can be overcome for improving the scan accuracy and quality of the flatbed scanners.

SUMMARY OF THE INVENTION

Accordingly, the invention discloses an apparatus and a method for improving the scan accuracy and quality. A plurality of optical rulers allocated along the scan direction of the image sensors are employed as alignment references for adjusting the moving steps. Each optical ruler is painted as line-pair patterns that are designed to be black and white blocks alternately arranged. The black and white blocks are further designed to have the same width. When the image sensor starts to scan, a calibrated image at the line-pair patterns is obtained that includes a plurality of black and white blocks alternately arranged. The actual moving distance of the image sensor can be easily obtained by calculating the number of the black and white pixels, and the pixels' positions derived from the gray levels of the calibrated image. The moving distance can be converted into moving steps of the image sensor. If the moving steps are less than requirement, the image sensor will be driven to scan again for enhancing the scan quality and accuracy.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
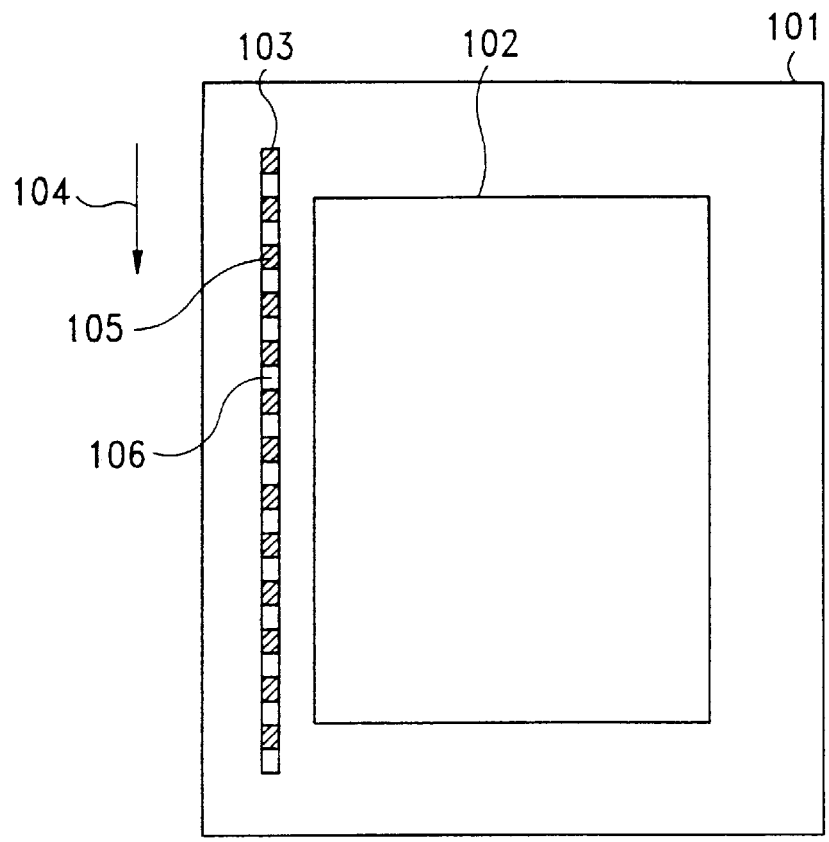
FIG. 1 is a schematic diagram showing the optical ruler provided on a back surface side of a top housing of a scanner.
Figure 2:
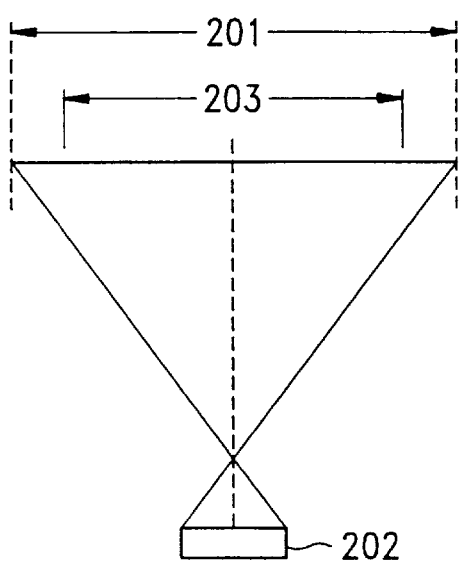
FIG. 2 is a schematic diagram showing the scanning ranges of the transparent window and the optical ruler with respecto to the transparent window and the optical ruler as shown on FIG. 1.

FIG. 1 illustrates a situation of when an optical ruler 103 is applied in a the back surface side of the top housing of scanner 101. A scanned document is put on the top of the transparent window 102, and the scanned side of the scanned document faces the transparent window 102. The scanned document is scanned following the scan direction 104. Black blocks 105 and white blocks 106 are painted alternately on the optical ruler 103. As noted, the black blocks 105 and the white blocks 106 are designed to have the same width in the embodiment. In addition, the optical ruler 103 is allocated against the transparent window 102, but the calibrated images generated from the optical ruler 103 will not appear at the scanned image of the scanned document. Accordingly, the width of the image sensor must be larger than the width of the transparent window 102. Please refer to FIG. 2, which describes the relation between the aforementioned widths. In the FIG. 2, the width 201 of the image sensor is obviously larger than the width 203 of the transparent window 103. However, an image sensor 202 (such as CIS or CCD (Charge-Coupled Device) sensor) is used to receive both the scanned images of the scanned document and the optical ruler.

Figure 3:
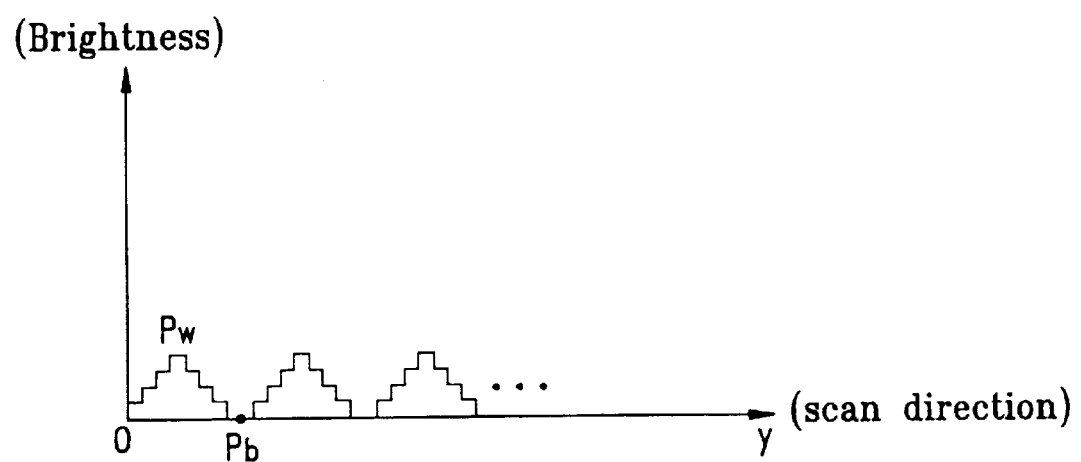
FIG. 3 is a schematic diagram showing the gray levels of an optical ruler along the scanning direction.

The scanned image obtained from the optical ruler 103 will include alternately black and white blocks. For example, FIG. 3 represents an example illustrative of the calibrated image having alternately black and white pixel blocks ($P_w$ and $P_b$, respectively) derived from the optical ruler 103. The length of the scanned image in the FIG. 3 increases along the scan direction. Obviously, the scanned image in the FIG. 3 can be applied to calculate the moving steps of the image sensor, because the number of the black and white pixels can be converted into moving distance of the image sensor. Furthermore, the moving distance also can be converted into the actual moving steps of the image sensor. Therefore, the actual moving steps can be compared with required moving steps. A closed loop control is thus completed by feeding back the moving distance to obtain the actual moving steps.

Furthermore, the scan operations must be re-performed when the difference between actual moving steps and required moving steps is higher than a pre-determined threshold. Typically, the scanner contains some memory buffers for storing the scanned data of the scanned images, the scanned data then being output batch-by-batch when the memory buffers are nearly full. Accordingly, the scan operations are interrupted temporaily for outputting the scanned data. However, the step motor keeps driving the image sensor to move for scanning. Thus, it may lose some scan lines during the interval of outputting the scanned data. The above-mentioned disadvantage will significantly influence the qualities of the scanned images, especially when higher image resolution is required today. By using the technology of the invention, the moving steps can be easily obtained. Furthermore, the calibrated image can be used to indicate where the scan line loss appears. The image compensation can be selectively performed to restore the scanned image at the place where the scan lines are lost, or to re-perform the scan operations when the total number of the scan line loss is higher than a pre-determined threshold. In addition, a plurality of optical rulers can be allocated close to the transparent window for the purpose of forming various calibration images based on different optical rulers.

In conclusion, the invention discloses an apparatus and a method for improving the scan accuracy and image quality. A closed loop control is applied by feeding back the moving distance of the image sensor to obtain the actual moving steps. The scan operations can be determined to be re-performed when the actual moving steps are less than a pre-determined threshold. The accuracy and quality of the scanned image can be enhanced without additional circuits and encoders.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A system for improving a scanned image quality for a flatbed scanner, comprising:
   a transparent window on the top housing of said flatbed scanner for placing a sheet;
   at least an optical ruler on the back surface side of said top housing and close to said transparent window along a scanning direction, said optical ruler having black and white blocks alternately arranged in an array;
   a step motor;
   image generating means having a width larger than the width of said transparent window for reading image information of said optical ruler along with said sheet while being progressively driven by said step motor; and
   means for determining actual moving steps of said step motor by calculating the number of black and white pixels from the scanned image of said optical ruler;
   whereby said image generating means is driven by said step motor to scan said sheet again when determining the actual moving steps of said step motor are fewer than a predetermined threshold value, or the frequency of the occurrences of said scan line losses is higher than a pre-determined threshold value.

2. The system according to claim 1, wherein said image generating means comprises an image sensor.

3. The apparatus according to claim 2, wherein said interlaced black and white pixels are used to calculate the moving distance of said image generating means.

4. The system according to claim 1, further comprising:
   means for identifying regions where scan line losses occurred in said scanned image of said sheet by referring to said scanned image of said optical ruler.

5. A method of increasing scanned image quality and accuracy of a flatbed scanner, comprising:
   generating a calibrated image with black and white pixels interlaced along a scanning direction by scanning an optical rule and a scanned image by scanning a document simultaneously in a scanning process, said optical rule having a plurality of black and white blocks arranged as a column along a scanning direction, each white block having the same size as each black block, and being adjacent and located between two black blocks, or being adjacent to only one black block if said white block is at an end of said optical ruler;
   identifying regions where scan line losses appear in said scanned image by using said calibrated image;
   determining actual moving steps of a step motor in accordance with said calibrated image; and
   regenerating said scanned image of said document when said actual moving steps are less than a moving pre-determined threshold, or when a total quantity of said scan line losses are higher than a pre-determined threshold.

6. The method according to claim 5, wherein said black and white pixels interlaced in said calibrated image are used to indicate that said calibrated image has gray levels from a center of a white pixel to a center of a black pixel, respectively, corresponding to a center of a white block to a center of a black block.

7. The apparatus according to claim 5, wherein said scan line losses are due to scanning operating being interrupted temporarily while outputting scanned data batch-by-batch.

8. A method of providing a closed loop control to a step motor of a flatbed scanner, said flatbed scanner having a transparent window on the top housing thereof for placing a document, comprising the steps of:
   providing at least an optical ruler on the back surface side of said top housing and close to said transparent window along a scanning direction, said optical ruler having equal-sized black and white blocks alternately arranged in an array;
   reading the image information of said optical ruler along with said document to form a calibration image and a scanned image of said document;
   identifying regions where scan line losses occurred in said scanned image of said document by referring to said calibrated image;
   determining actual moving steps of a step motor by calculating the number of black and white pixels of said calibrated image; and sending a closed loop control signal to said step motor to read the image information of said document again when determining the actual moving steps of said step motor are less than a pre-determined threshold value, or the frequency of the occurrences of said scan line losses is higher than a pre-determined threshold value.

9. The method according to claim 8, wherein said black and white blocks of said at least one optical rule are alternately arranged for easy to identify a missing scan line in said scanned image of said document.

* * * * *